US010396694B2

(12) United States Patent
Ren et al.

(10) Patent No.: US 10,396,694 B2
(45) Date of Patent: Aug. 27, 2019

(54) SYSTEM AND METHOD FOR MINIMIZING REACTIVE CURRENT TO LIMIT ROTOR MODULATION INDEX ON A POWER CONVERTER

(71) Applicant: General Electric Company, Schenectady, NY (US)

(72) Inventors: Wei Ren, Niskayuna, NY (US); Einar Vaughn Larsen, Charlton, NY (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/072,774

(22) Filed: Mar. 17, 2016

(65) Prior Publication Data

US 2017/0272014 A1 Sep. 21, 2017

(51) Int. Cl.
| | |
|---|---|
| *H02P 9/00* | (2006.01) |
| *F03D 9/00* | (2016.01) |
| *H02M 1/42* | (2007.01) |
| *H02J 3/18* | (2006.01) |
| *F03D 9/25* | (2016.01) |

(52) U.S. Cl.
CPC .............. *H02P 9/007* (2013.01); *F03D 9/255* (2017.02); *H02J 3/18* (2013.01); *H02M 1/42* (2013.01); *Y02B 70/12* (2013.01)

(58) Field of Classification Search
CPC ................................. F03D 9/003; H02P 9/007
See application file for complete search history.

(56) References Cited

U.S. PATENT DOCUMENTS

| 5,798,631 | A | * | 8/1998 | Spee | ..................... F03D 7/0272 290/31 |
|---|---|---|---|---|---|
| 2003/0163296 | A1 | * | 8/2003 | Richards | ............. G06F 17/5036 703/14 |
| 2005/0071095 | A1 | * | 3/2005 | El-Ibiary | ................. H02P 23/14 702/60 |
| 2007/0024059 | A1 | * | 2/2007 | D'Atre | .................. F03D 7/0272 290/44 |
| 2007/0052244 | A1 | * | 3/2007 | Hudson | ................. F03D 7/0272 290/44 |
| 2007/0108771 | A1 | * | 5/2007 | Jones | ...................... H02P 9/102 290/44 |
| 2007/0121354 | A1 | * | 5/2007 | Jones | .................. H02M 5/4585 363/47 |

(Continued)

*Primary Examiner* — Tulsidas C Patel
*Assistant Examiner* — Joseph Ortega
(74) *Attorney, Agent, or Firm* — Dority & Manning, P.A.

(57) ABSTRACT

The present subject matter is directed to a system and method for operating an electrical power circuit connected to a power grid. The power circuit includes a power converter electrically coupled to a generator. The method includes monitoring at least one speed condition of the generator during operation of the power circuit. Another step includes determining one or more voltage conditions of the power circuit. The method also includes calculating a maximum reactive current for the generator as a function of at least one of the speed condition or the one or more voltage conditions. Thus, the method also includes operating the generator based on the maximum reactive current so as to prevent an actual modulation index of the power converter from exceeding a predetermined threshold.

16 Claims, 6 Drawing Sheets

(56) References Cited

U.S. PATENT DOCUMENTS

| | | | | |
|---|---|---|---|---|
| 2010/0045040 | A1* | 2/2010 | Bendixen | F03D 7/0272 290/44 |
| 2011/0049903 | A1* | 3/2011 | Jorgensen | F03D 7/0224 290/55 |
| 2011/0089693 | A1* | 4/2011 | Nasiri | F03D 7/0272 290/44 |
| 2011/0210553 | A1* | 9/2011 | Engelhardt | H02P 9/006 290/44 |
| 2012/0032622 | A1* | 2/2012 | Lipo | H02P 21/0089 318/400.27 |
| 2012/0038156 | A1* | 2/2012 | Hehenberger | F03D 7/0284 290/44 |
| 2013/0148394 | A1* | 6/2013 | O'Brien | H02J 3/383 363/95 |
| 2013/0187384 | A1* | 7/2013 | Li | F03D 9/255 290/44 |
| 2013/0241201 | A1* | 9/2013 | Fortmann | H02J 3/26 290/44 |
| 2013/0249501 | A1* | 9/2013 | Lu | F03D 7/0224 322/21 |
| 2014/0138949 | A1* | 5/2014 | El Moursi | H02P 29/032 290/44 |
| 2014/0313795 | A1* | 10/2014 | Mi | H02M 1/44 363/44 |
| 2014/0316604 | A1* | 10/2014 | Ortjohann | H02J 3/381 700/298 |
| 2015/0002068 | A1* | 1/2015 | Durham | H02M 7/539 318/503 |
| 2015/0137518 | A1* | 5/2015 | Yin | F03D 7/0284 290/44 |
| 2015/0249412 | A1* | 9/2015 | Larsen | H02M 5/4585 290/44 |
| 2015/0249413 | A1* | 9/2015 | Ren | H02P 9/007 290/44 |
| 2015/0263521 | A1* | 9/2015 | Garcia | F03D 7/048 307/52 |
| 2016/0201651 | A1* | 7/2016 | Beekman | H02J 3/386 290/44 |
| 2016/0268940 | A1* | 9/2016 | Achilles | H02J 3/1842 |
| 2016/0329844 | A1* | 11/2016 | Sato | H02P 1/58 |
| 2017/0353036 | A1* | 12/2017 | Gil Lizarbe | H02J 3/386 |

* cited by examiner

SYSTEM AND METHOD FOR MINIMIZING REACTIVE CURRENT TO LIMIT ROTOR MODULATION INDEX ON A POWER CONVERTER

FIELD OF THE INVENTION

The present disclosure relates generally to wind turbines and, more particularly, to a system and method for limiting reactive current to avoid over-modulation-index on a power converter of a wind turbine generator.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

In many wind turbines, the generator rotor may be electrically coupled to a bi-directional power converter that includes a rotor-side converter joined to a line-side converter via a regulated DC link. More specifically, some wind turbines, such as wind-driven doubly-fed induction generator (DFIG) systems or full power conversion systems, may include a power converter with an AC-DC-AC topology.

DFIG operation is typically continuously pushed toward a wider speed range to increase annual energy production (AEP). In certain instances, however, it has been observed that under over-speed operating conditions, the rotor modulation index is constantly around or even higher than 1.0. Thus, whenever there is a grid event such as a high-voltage ride through (HVRT) or sub-synchronous resonance, this narrow margin (between the steady state modulation index and a higher modulation index such as 1.15 and beyond) can quickly disappear and the DFIG may lose its stable control.

To address this issue, certain DFIG systems include a reactive current logic under high-slip conditions so as to reduce the rotor voltage by commanding inductive current whenever a high level of stator voltage is expected. This logic takes the stator voltage magnitude as the major input and uses high pass filter and proportional gain to generate an inductive current command to reduce rotor voltage. Though this logic has been proven effective, over-modulation at the rotor converter is observed in a few cases which fails to assists the DFIG in regaining stability.

In view of the aforementioned issues, a control methodology that calculates the maximum reactive current given the maximum rotor modulation index and one or more DFIG operating conditions rather than using the stator voltage magnitude and a regulator-type of control to limit reactive current would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating an electrical power circuit connected to a power grid. The electrical power circuit includes a power converter electrically coupled to a generator. The method includes monitoring at least one speed condition of the generator during operation of the electrical power circuit. Another step includes determining one or more voltage conditions of the electrical power circuit. The method also includes calculating, via a controller, a maximum reactive current for the generator as a function of at least one of the speed condition or the one or more voltage conditions. Thus, the method also includes operating the generator based on the maximum reactive current so as to prevent an actual modulation index of the power converter from exceeding a predetermined threshold.

In one embodiment, the method may further include determining a maximum rotor modulation index for the power converter and calculating, via the controller, the maximum reactive current for the generator as a function of at least one of the speed condition, the one or more voltage conditions, and the maximum rotor modulation index.

In another embodiment, the speed condition(s) of the generator may include a rotor speed of a rotor of the generator, a slip of the generator, or any other speed condition of the generator.

In further embodiments, the step of determining one or more voltage conditions of the electrical power circuit may include monitoring at least one of a stator voltage of a stator of the generator, a rotor voltage of the rotor of the generator, a DC link voltage of a DC link of the power converter, or a grid voltage of the power grid.

In such embodiments, the method may also include determining one or more circuit parameters of the electrical power circuit and calculating the maximum reactive current for the generator as a function of the at least one speed condition, the DC link voltage, the maximum rotor modulation index, the one or more circuit parameters, and at least one of the stator voltage, the rotor voltage, or the grid voltage of the power grid. More specifically, in certain embodiments, the circuit parameter(s) may include a stator leakage reactance, a rotor leakage reactance, a magnetizing reactance, or similar.

In further embodiments, the step of monitoring the speed condition(s) of the generator may include monitoring the rotor speed of the rotor of the generator via one or more sensors. For example, the sensor(s) may include electric current or voltage sensors configured to generate one or more current or voltage feedback signals of the electrical power circuit.

In additional embodiments, the step of determining the maximum rotor modulation index for the power converter may include comparing an actual measured rotor modulation index with a reference rotor modulation index to determine an error, and determining the maximum rotor modulation index as a function of the error. More specifically, in certain embodiments, the step of comparing the actual measured rotor modulation index with the reference rotor modulation index to determine the error may include subtracting the actual measured rotor modulation index from the reference rotor modulation index.

Thus, in such embodiments, the method may also include increasing the maximum rotor modulation index if the error is positive or decreasing the maximum rotor modulation index if the error is negative.

In yet another embodiment, the electrical power circuit may be part of a wind turbine power system.

In another aspect, the present disclosure is directed to a method for operating an electrical power system connected to a power grid. The electrical power system includes a power converter electrically coupled to a generator. The method includes monitoring a rotor speed of a rotor of the generator during operation of the electrical power circuit. The method also includes determining a stator voltage of a stator of the generator during operation of the electrical power circuit. Further, the method includes determining a maximum rotor modulation index for the power converter. Moreover, the method includes determining a DC link voltage of a DC link of the power converter. As such, the method may also include calculating, via a controller, a maximum reactive current for the generator as a function of the rotor speed, the stator voltage, the maximum rotor modulation index, and the DC link voltage. Thus, the method includes operating the generator based on the maximum reactive current so as to prevent an actual modulation index of the power converter from exceeding a predetermined threshold. It should be understood that the method may further include any of the additional steps and/or features as described herein.

In yet another aspect, the present disclosure is directed to a wind turbine power system. The wind turbine power system includes a generator having a rotor and a stator, a power converter having a line-side converter electrically coupled to a power grid and a rotor-side converter electrically coupled to the generator, and a controller communicatively coupled to at least one of the power converter and the generator. Further, the controller is configured to perform one or more operations, including but not limited to monitoring a rotor speed of the rotor during operation of the wind turbine power system, determining one or more voltage conditions of the wind turbine power system, determining a maximum rotor modulation index for the power converter, calculating a maximum reactive current for the generator as a function of at least one of the rotor speed, the one or more voltage conditions, and the maximum rotor modulation index, and operating the generator based on the maximum reactive current so as to prevent an actual modulation index of the power converter from exceeding a predetermined threshold. It should be understood that the wind turbine power system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for operating a wind turbine power system connected to a power grid. The wind turbine power system generally includes a power converter electrically coupled to a generator. Thus, in one embodiment, the method includes monitoring a rotor speed of the generator during operation of the electrical power circuit and determining a stator voltage of the generator and a DC link voltage of the power converter. The method may also include determining a maximum rotor modulation index for the power converter. Further, the method includes calculating a maximum reactive current for the generator as a function of the rotor speed, the stator voltage, the DC link voltage, and/or the maximum rotor modulation index. As such, the method also includes operating the generator based on the maximum reactive current so as to prevent an actual modulation index of the power converter from exceeding a predetermined threshold that would cause instability to the system.

The present disclosure provides many advantages not present in the prior art. For example, the system and method of the present disclosure allows the wind turbine generator to operate at more economical conditions while still being able to keep up with the most stringent grid fault ride through requirements.

Figure 1:
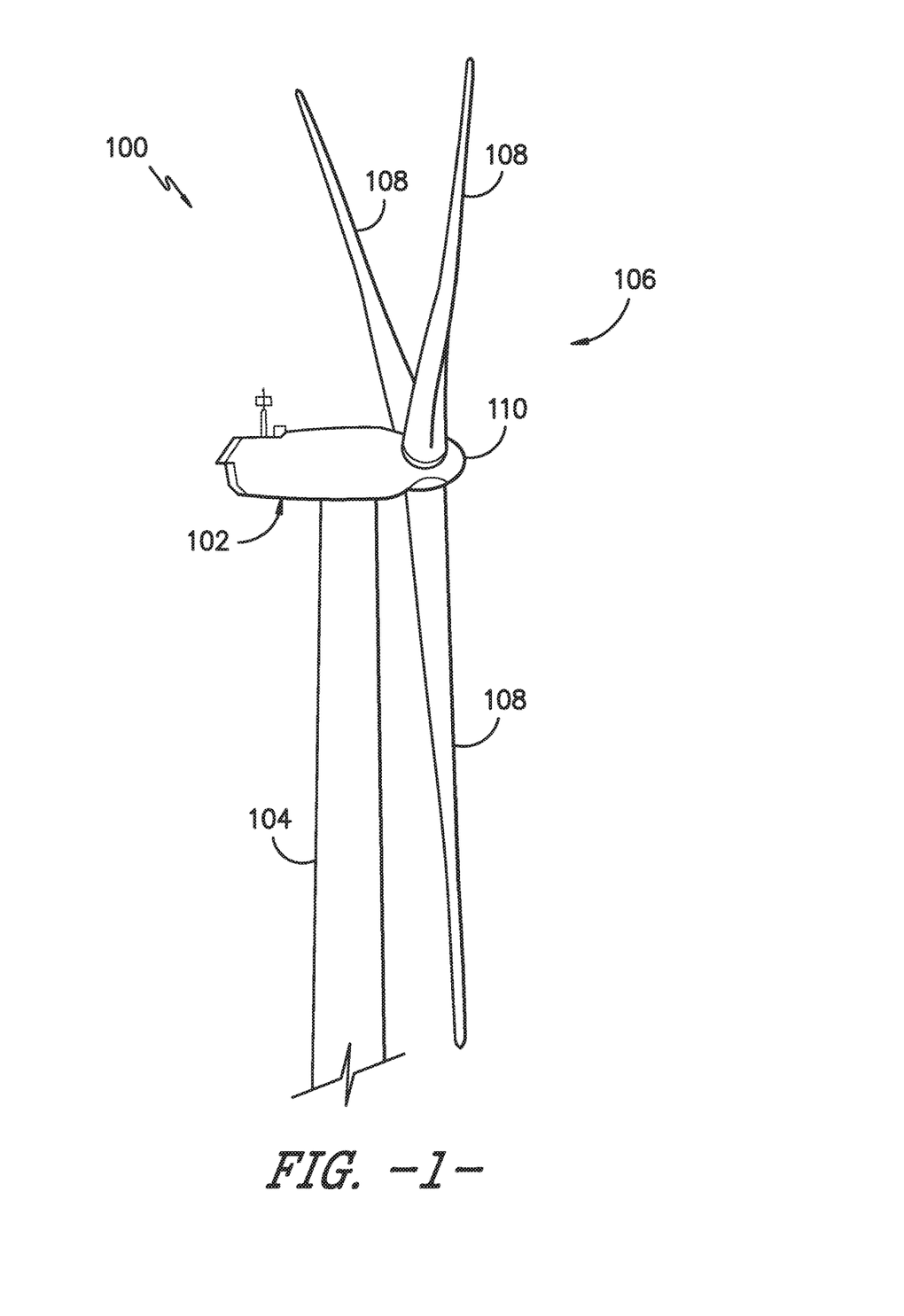
FIG. 1 illustrates a perspective view of a portion of one embodiment of a wind turbine according to the present disclosure.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
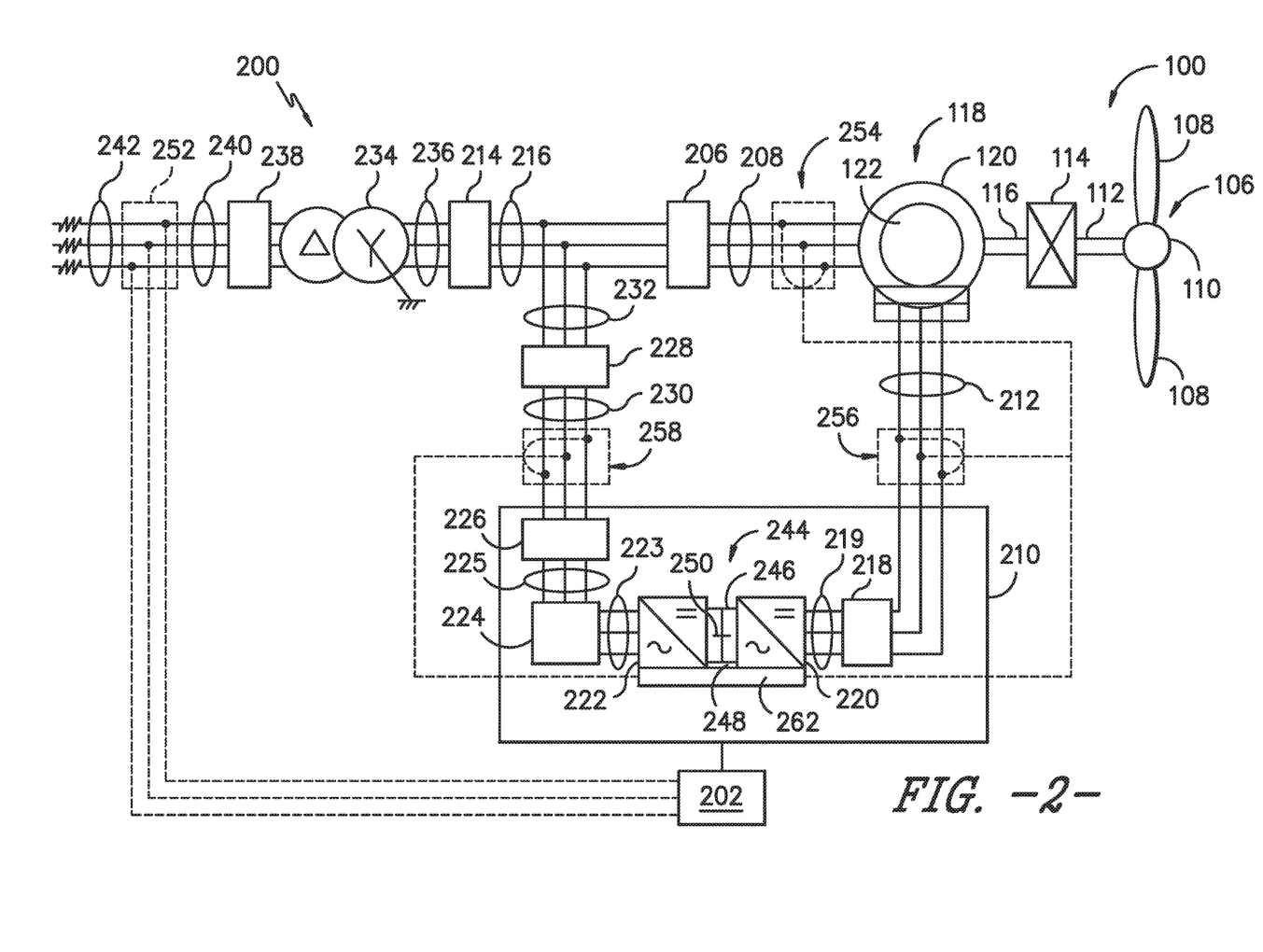
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Figure 3:
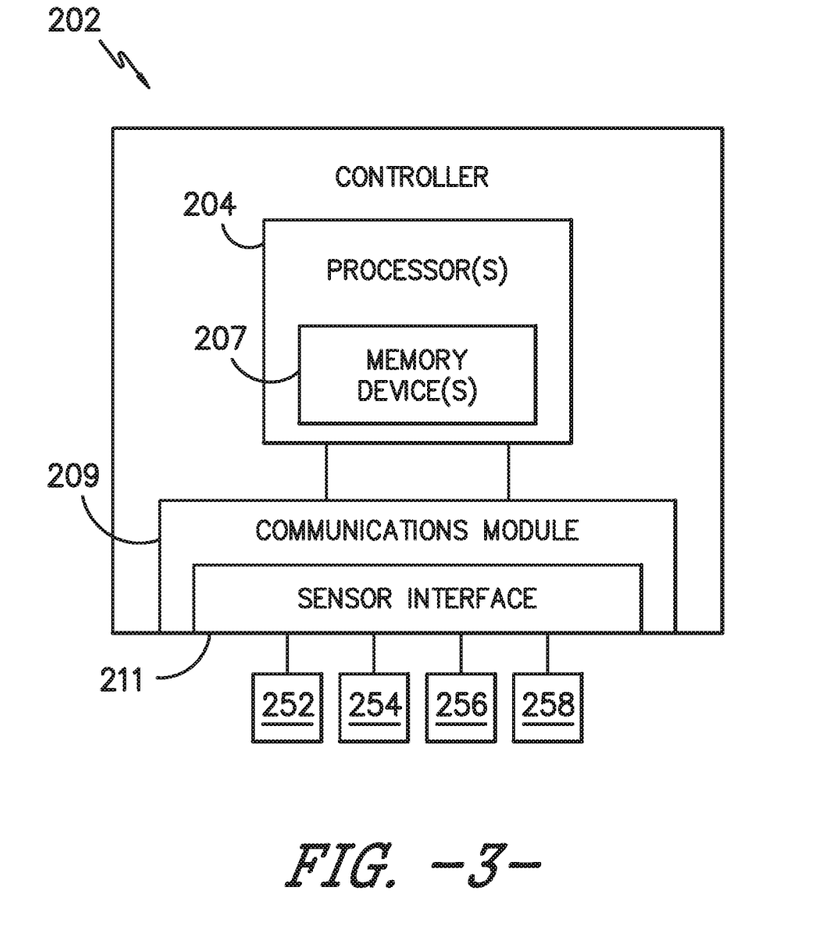
FIG. 3 illustrates a block diagram of one embodiment of a controller suitable for use with the wind turbine shown in FIG. 1.

In addition, the electrical and control system 200 may include a wind turbine controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line feedback signals, line-side converter feedback signals, rotor-side converter feedback signals, or stator feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Figure 4:
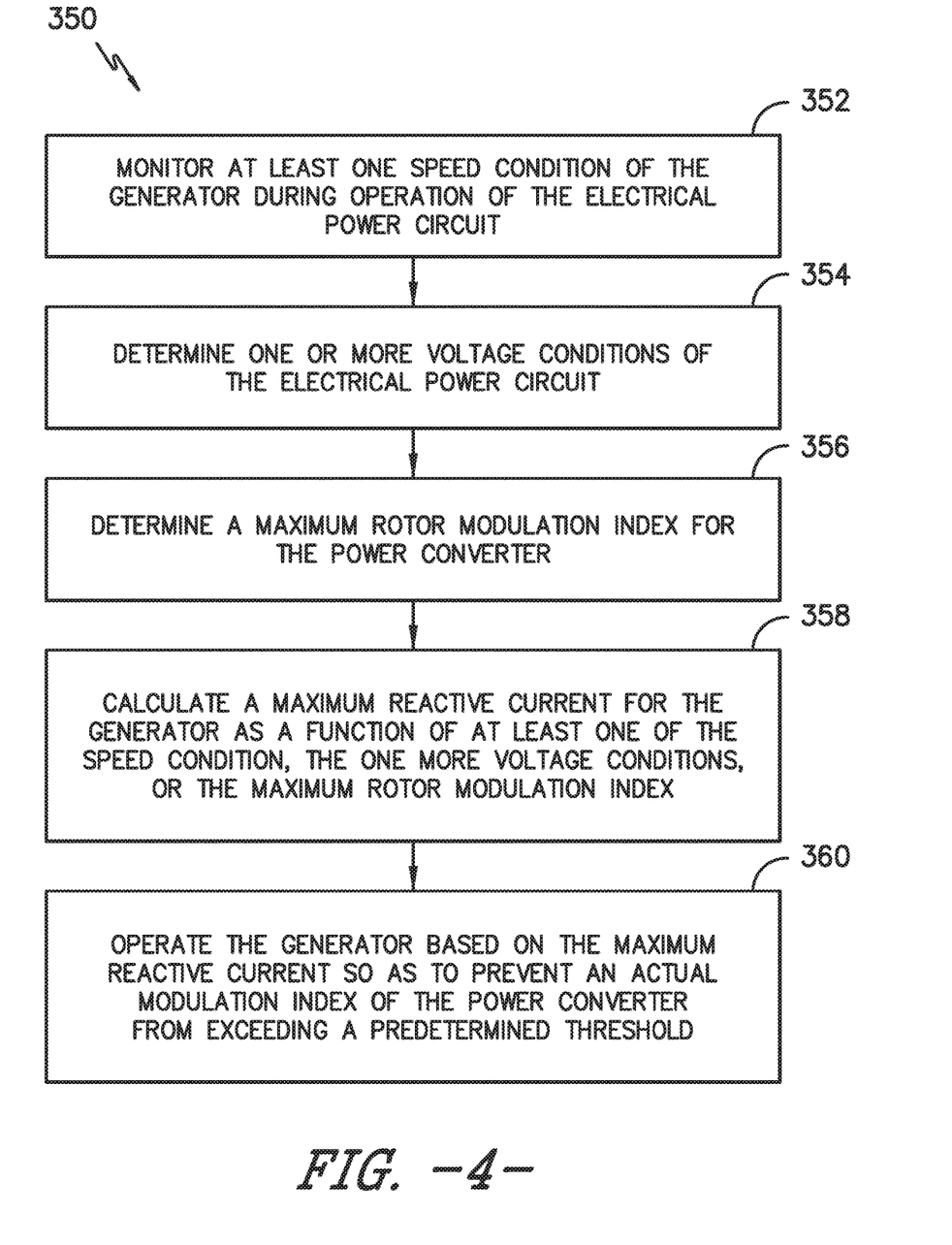
FIG. 4 illustrates a flow diagram of one embodiment of a method for operating an electrical power circuit connected to a power grid according to the present disclosure.
Figure 5:
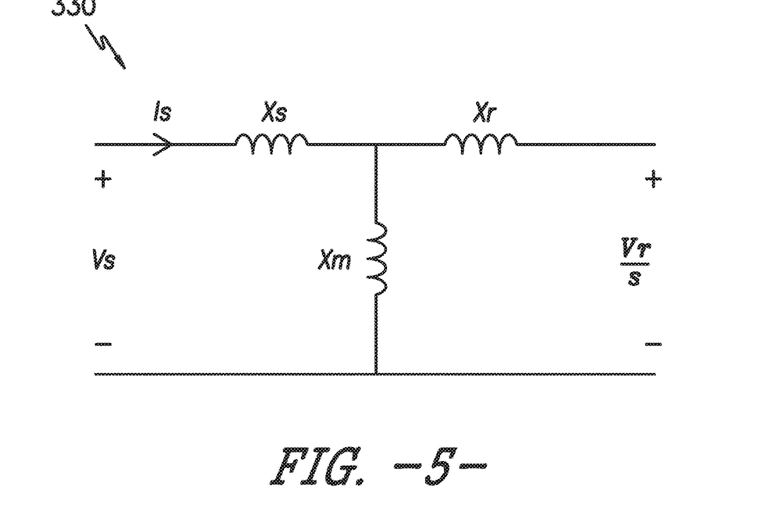
FIG. 5 illustrates a simplified schematic diagram of one embodiment of an electrical power circuit according to the present disclosure.
Figure 6:
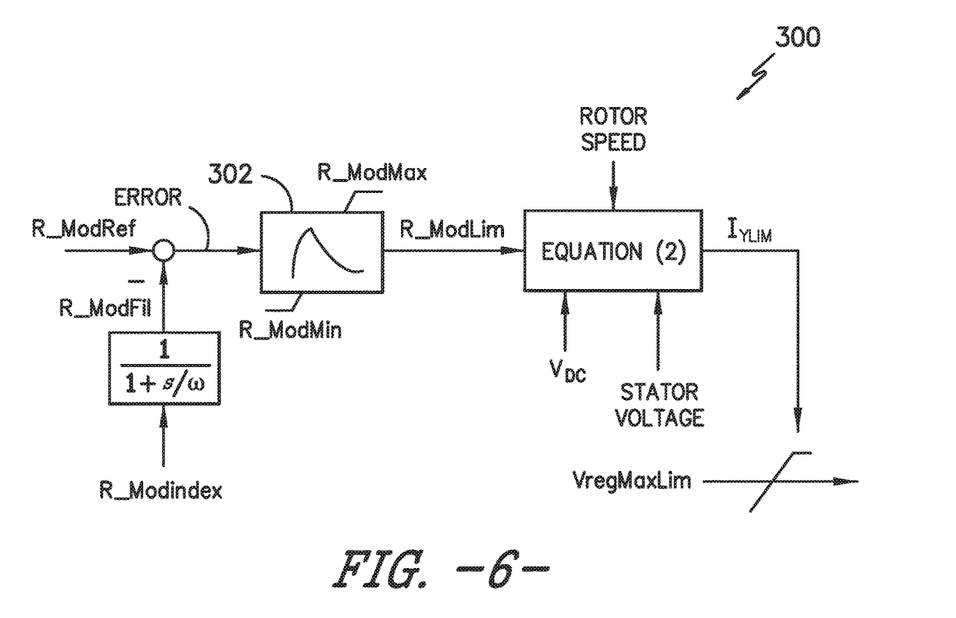
FIG. 6 illustrates a schematic diagram of one embodiment of a system for operating an electrical power circuit connected to a power grid according to the present disclosure.

Referring now to FIGS. 4-6, various illustrations are provided to further describe the systems and methods of the present disclosure. For example, FIG. 4 illustrates a flow diagram of one embodiment of a method 350 for operating an electrical power system (e.g. the wind turbine power system of FIG. 2) connected to a power grid 242; FIG. 5 illustrates a simplified schematic diagram of one embodiment of an electrical power circuit 330 according to the present disclosure; and FIG. 6 illustrates a schematic diagram of one embodiment a system 300 for operating an electrical power circuit 330 according to the present disclosure. More specifically, as shown in FIG. 5, the simplified circuit diagram neglects the resistive elements and assumes reactive current is purely determined by the magnitude of the stator and rotor voltages.

Referring to FIG. 4, as shown at 352, the method 350 includes monitoring at least one speed condition of the generator 118 during operation thereof. More specifically, in one embodiment, the speed condition(s) of the generator 118 may include a rotor speed of the rotor 122, a slip of the generator 118 (e.g. represented as "s" in FIG. 5), or any other speed condition of the generator 118. In addition, the rotor speed may be monitored using the sensors 252, 254, 256, 258 as described herein. For example, the sensor(s) 252, 254, 256, 258 may include electric current or voltage sensors configured to generate one or more current or voltage feedback signals of the electrical power circuit, such as those described herein.

As shown at 354, the method 350 also includes determining one or more voltage conditions of the electrical power circuit 330. For example, in one embodiment, the step of determining one or more voltage conditions of the electrical power circuit 330 may include monitoring one or more of the following voltage conditions: a stator voltage (e.g. $V_S$ in FIG. 5) of the generator stator 120, a rotor voltage (e.g. $V_R$ in FIG. 5) of the generator rotor 122, a DC link voltage of the DC link 244 of the power converter 210, or a grid voltage of the power grid 242.

As shown at 356, the method 350 may further include determining a maximum rotor modulation index for the rotor-side converter 220 of the power converter 210. More specifically, as shown in FIG. 6, the step of determining the maximum rotor modulation index (R_ModLim, for the rotor-side converter 220 may include comparing an actual measured rotor modulation index (R_ModIndex) with a pre-determined maximum rotor modulation index threshold (R_ModThreshold) to determine an error. Further, the method 350 may include determining the maximum rotor modulation index R_ModLim as a function of the error. More specifically, as shown, the step of comparing the actual measured rotor modulation index R_ModIndex with the reference rotor modulation index R_ModThreshold to determine the error may include subtracting the actual measured rotor modulation index R_ModIndex from the reference rotor modulation index R_ModThreshold. Alternatively, the step of comparing the actual measured rotor modulation index R_ModIndex with the reference rotor modulation index R_ModThreshold to determine the error may include subtracting the reference rotor modulation index R_ModThreshold from the actual measured rotor modulation index R_ModIndex. For example, as shown in FIG. 6, the system 300 may include a fast-up/slow-down regulator 302 that is designed to compensate for the calculation error from the simplifications discussed above in regards to FIG. 5, i.e. neglecting resistive elements and assuming reactive current is purely determined by the magnitude of the stator and rotor voltages. In such embodiments, the method 350 may include increasing, via the regulator 302, the maximum rotor modulation index R_ModThreshold if the error is positive or decreasing the maximum rotor modulation index if the error is negative.

For example, in certain embodiments, the regulator 302 operates by assuming one or more reference modulation index values, e.g. R_ModThreshold=1.15, R_ModMax=1.20, and R_ModMin=1.05. Thus, if the rotor 122 is operating with a modulation index lower than R_ModThreshold, the error from the reference maximum modulation index and the actual modulation index will push R_ModLim to its upper limit, or R_ModMax=1.20. This action sets the maximum reactive current $I_{YLIM}$ to a value high enough such that the logic is not in action. In contrast, when the rotor 122 is operating at a modulation index consistently higher than R_ModThreshold, the error will push R_ModLim lower until the new maximum reactive current $I_{YLIM}$ can effectively control the actual modulation index to around R_ModThreshold.

Thus, referring back to FIG. 4 as shown at 358, the method 350 includes calculating a maximum reactive current (e.g. $I_S$ in FIG. 5) for the generator 118 as a function of the speed condition(s), the one or more voltage conditions, and the maximum rotor modulation index. More specifically, in certain embodiments, the method 350 may include determining one or more circuit parameters of the electrical power circuit 330. For example, as shown in FIG. 5, the circuit parameter(s) may include a stator leakage reactance $X_S$, a rotor leakage reactance $X_R$, a magnetizing reactance $X_M$, or similar. Thus, as shown in FIG. 6, the method 350 may further include calculating the maximum reactive current $I_S$ for the generator 118 as a function of the speed condition(s) (i.e. rotor speed), the DC link voltage $V_{DC}$, the maximum rotor modulation index R_ModLim, the one or more circuit parameters, and/or the stator voltage. More specifically, in one embodiment, the maximum reactive current $I_S$ may be calculated using Equations (1), (2), and (3). For example, according to the superposition rule, the stator current $I_S$ can be calculated by summing the resulted current from applying only VS or VR/s, where "s" is the slip, separately, which is represented by Equation (1) below:

$$jIsy = \frac{V_S}{j(X_S + X_R \| X_M)} - \frac{\frac{V_R}{s}}{j(X_R + X_S \| X_M)} * \frac{X_M}{X_S + X_M} \quad \text{Equation (1)}$$

Removing the imaginary sign "j" from both sides yields Equation (2) below:

$$Isy = \frac{\frac{V_R}{s}}{(X_R + X_S \| X_M)} * \frac{X_M}{X_S + X_M} - \frac{V_S}{(X_S + X_R \| X_M)} \quad \text{Equation (2)}$$

By knowing the stator voltage magnitude, the DFIG circuit parameters, and the slip, the maximum stator $I_Y$ current may be calculated given the maximum rotor voltage magnitude. More specifically, the maximum rotor voltage magnitude may be determined by the maximum modulation index and the DC voltages using Equation (3) below:

$$V_{R_{MAX}} = R_{ModLim} * \frac{0.5 * V_{DC}}{1000 * VRBASE * \sqrt{\frac{2}{3}}} \quad \text{Equation (3)}$$

Where VDC is the DC voltage in volts (V), and
VRBASE is the rated rotor line-line RMD voltage in kV.

Accordingly, as shown at 360 of FIG. 4, the method 350 may also include operating the generator 118 based on the maximum reactive current so as to prevent an actual modulation index of the power converter 210 from exceeding a predetermined threshold.

Figure 7:
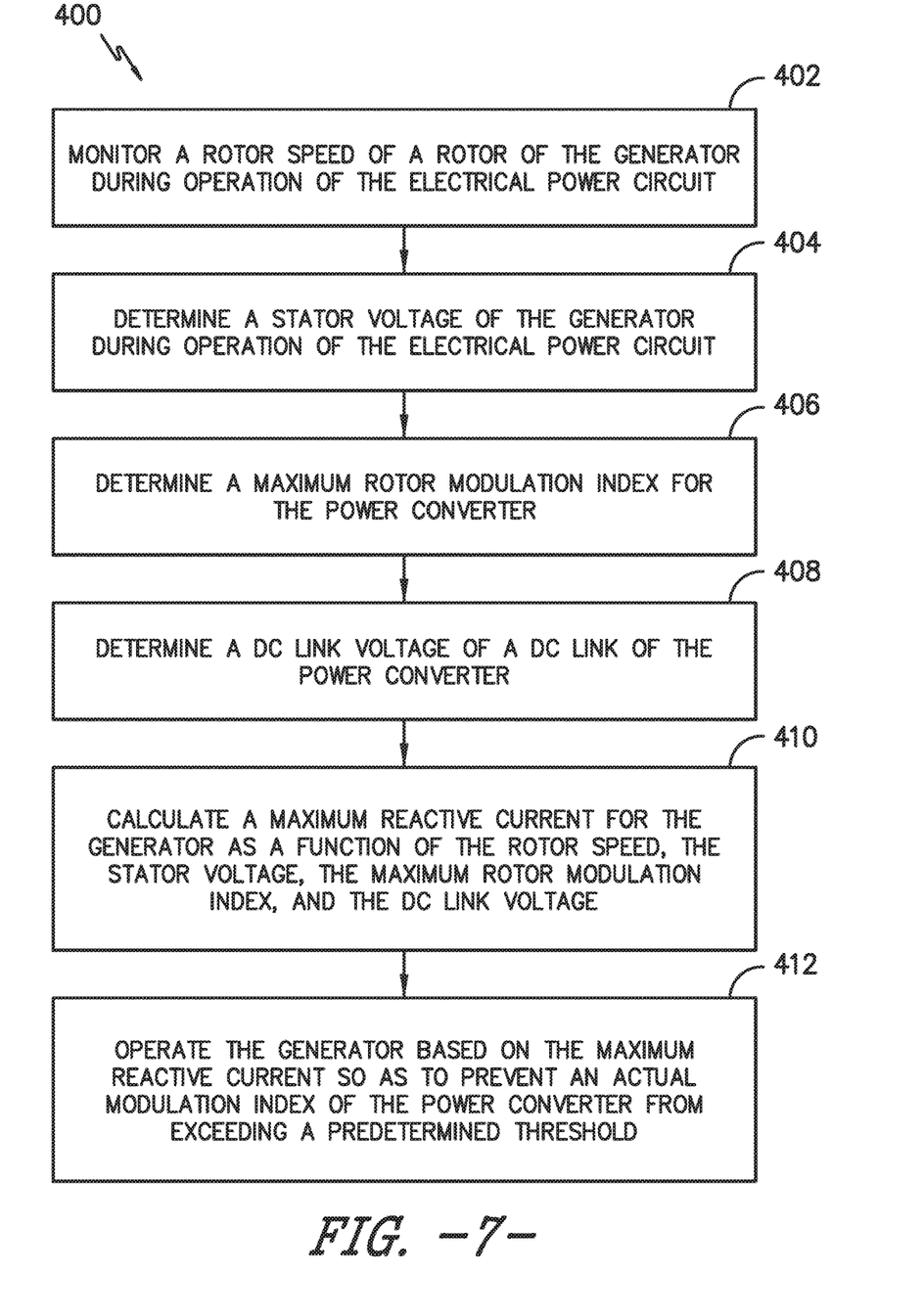
FIG. 7 illustrates a flow diagram of another embodiment of a method for operating a wind turbine connected to a power grid according to the present disclosure.

Referring now to FIG. 7, a flow diagram of another embodiment of a method 400 for operating an electrical power system (e.g. the wind turbine power system 200 of FIG. 2) connected to a power grid 242 is illustrated. Thus, as shown at 402, the method 400 includes monitoring a rotor speed of the generator rotor 122 during operation of the electrical power system. As shown at 404, the method 400 includes determining a stator voltage of the generator stator 120 during operation of the electrical power circuit. As shown at 406, the method 400 includes determining a maximum rotor modulation index for the power converter 210. As shown at 408, the method 400 includes determining a DC link voltage of the DC link 244 of the power converter 210. As shown at 410, the method 400 includes calculating a maximum reactive current for the generator 118 as a function of the rotor speed, the stator voltage, the maximum rotor modulation index, and the DC link voltage. Thus, as shown at 412, the method includes operating the generator 118 based on the maximum reactive current so as to prevent an actual modulation index of the power converter 210 from exceeding a predetermined threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for operating an electrical power circuit connected to a power grid, the electrical power circuit having a power converter electrically coupled to a generator, the method comprising:

monitoring, via one or more sensors, at least one speed condition of the generator during operation of the electrical power circuit;

determining, via one or more sensors, one or more voltage conditions of the electrical power circuit;

calculating, via a controller, a maximum reactive current for the generator using a mathematical function of the speed condition and the one or more voltage conditions, the mathematical function comprising dividing at least one of the one or more voltage conditions by the speed condition; and, operating the generator by imposing a limit on a reactive current of the generator requested by reactive current logic of the controller such that the maximum reactive current is not exceeded, thereby preventing an actual modulation index of the power converter from exceeding a predetermined threshold; and continuously adjusting the limit on the reactive current as a function of the at least one speed condition, the one or more voltage conditions of the electrical power circuit, a slip of the generator, and one or more generator circuit parameters, the one or more generator circuit parameters comprising a stator leakage reactance and a rotor leakage reactance.

2. The method of claim 1, further comprising: determining a maximum rotor modulation index for the power converter and calculating, via the controller, the maximum reactive current for the generator as a function of at least one of the speed condition, the one or more voltage conditions, and the maximum rotor modulation index.

3. The method of claim 2, wherein determining one or more voltage conditions of the electrical power circuit further comprises monitoring at least one of a stator voltage of a stator of the generator, a rotor voltage of the rotor of the generator, a DC link voltage of a DC link of the power converter, or a grid voltage of the power grid.

4. The method of claim 2, wherein determining the maximum rotor modulation index for the rotor-side converter further comprises:

comparing an actual measured rotor modulation index with a reference rotor modulation index to determine an error, and determining the maximum rotor modulation index as a function of the error.

5. The method of claim 4, wherein comparing the actual measured rotor modulation index with the reference rotor modulation index to determine the error further comprises subtracting the actual measured rotor modulation index from the reference rotor modulation index.

6. The method of claim 5, further comprising; increasing the maximum rotor modulation index if the error is a positive value or decreasing the maximum rotor modulation index if the error is a negative value.

7. The method of claim 1, wherein the at least one speed condition of the generator comprises at least one of rotor speed of a rotor of the generator or a slip of the generator.

8. The method of claim 1, wherein the one or more generator circuit parameters further comprise a magnetizing reactance.

9. The method of claim 1, wherein the one or more sensors comprises electric current or voltage sensors configured to generate one or more current or voltage feedback signals of the electrical power circuit.

10. The method of claim 1, wherein the electrical power circuit is part of a wind turbine power system.

11. A wind turbine power system, comprising:

a generator having a rotor and a stator;

a power converter comprising a line-side converter electrically coupled to a power grid and a rotor-side converter electrically coupled to the generator;

one or more sensors for monitoring a speed condition of a generator of the wind turbine and one or more voltage conditions of the wind turbine power system, a controller communicatively coupled to at least one of the power converter, the one or more sensors, and the generator, the controller configured to perform one or more operations, the one or more operations comprising:

calculating a maximum reactive current for the generator using a mathematical function of the speed condition and the one or more voltage conditions, the mathematical function comprising dividing at least one of the one or more voltage conditions by the speed condition, and operating the generator by imposing a limit on a reactive current of the generator requested by reactive current logic of the controller such that the maximum reactive current is not exceeded, thereby preventing an actual modulation index of the power converter from exceeding a predetermined threshold; and continuously adjusting the limit on the reactive current as a function of the at least one speed condition, the one or more voltage conditions of the electrical power circuit, a slip of the generator, and one or more generator circuit parameters, the one or more generator circuit parameters comprising a stator leakage reactance and a rotor leakage reactance.

12. The system of claim 11, wherein the controller is further configured to determine a maximum rotor modulation index for the power converter and calculate the maximum reactive current for the generator as a function of at least one of the speed condition, the one or more voltage conditions, and the maximum rotor modulation index.

13. The system of claim 11, wherein the controller is further configured to determine a slip of the generator.

14. The system of claim 11, wherein the one or more voltage conditions of the wind turbine power system comprise at least one of a stator voltage of a stator of the generator, a rotor voltage of the rotor of the generator, a DC link voltage of a DC link of the power converter, or a grid voltage of the power grid.

15. The system of claim 11, wherein the one or more generator circuit parameters further comprise a magnetizing reactance.

16. The system of claim 11, wherein determining the maximum rotor modulation index for the rotor-side converter further comprises:

comparing an actual measured rotor modulation index with a reference rotor modulation index to determine an error, determining the maximum rotor modulation index as a function of the error, and increasing the maximum rotor modulation index if the error is a positive value or decreasing the maximum rotor modulation index if the error is a negative value.

* * * * *